(12) United States Patent
Nakane

(10) Patent No.: US 6,240,534 B1
(45) Date of Patent: May 29, 2001

(54) APPARATUS AND METHOD FOR DETECTING ABNORMALITY-MONITORING CIRCUIT MALFUNCTION

(75) Inventor: Fumihiko Nakane, Nishio (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/137,524

(22) Filed: Aug. 21, 1998

(30) Foreign Application Priority Data

Sep. 24, 1997 (JP) .................................................. 9-258881

(51) Int. Cl.⁷ ...................................................... G06F 11/30
(52) U.S. Cl. ................................ 714/55; 714/24; 714/48; 714/100; 714/51; 700/79
(58) Field of Search ................................. 714/24, 55, 48, 714/100, 51; 700/79

(56) References Cited

U.S. PATENT DOCUMENTS

| | | | |
|---|---|---|---|
| 4,162,719 | * | 7/1979 | Husson et al. .................. 187/382 |
| 5,588,720 | * | 12/1996 | Mattern ...................... 303/122.08 |
| 5,850,514 | * | 12/1998 | Gonda et al. ...................... 714/55 |
| 5,897,596 | * | 4/1999 | Kabune et al. .................... 701/29 |

FOREIGN PATENT DOCUMENTS

| | | |
|---|---|---|
| 4-369740 | 12/1992 | (JP) . |
| 6-301574 | 1/1994 | (JP) . |
| 60-84644 | 3/1994 | (JP) . |
| 5-14281B2 | 7/1996 | (JP) . |

* cited by examiner

Primary Examiner—Ly V. Hua
(74) Attorney, Agent, or Firm—Nixon & Vanderhye P.C.

(57) ABSTRACT

Reliably detecting malfunction of an abnormality-monitoring circuit during operation of a processing unit. An electronic control unit provided with a CPU level-inverts and outputs an actuating signal during each iteration of a base routine. An abnormality-monitoring circuit clocks a fall interval of the actuating signal as charging voltage of a gradually discharged capacitor, and outputs a reset signal to the CPU when this charging voltage falls to a defined value. When a check-starting condition is fulfilled, the CPU inhibits a subsequent level inversion of the actuating signal until a predetermined time elapses after a prior level inversion. When the signal inhibition is canceled, when the charging voltage VC of the capacitor is not within a reference range (VL–VH), the CPU determines the abnormality-monitoring circuit to have malfunctioned.

12 Claims, 7 Drawing Sheets

APPARATUS AND METHOD FOR DETECTING ABNORMALITY-MONITORING CIRCUIT MALFUNCTION

CROSS-REFERENCE TO RELATED APPLICATIONS

This application is based on, and claims priority from, Japanese Patent Application No. Hei 9-258881, filed on Sep. 24, 1997, the contents of which are hereby incorporated by reference.

BACKGROUND OF THE INVENTION

1. Technical Field

This invention relates to an apparatus and method for detecting a malfunction of a processing unit abnormality-monitoring circuit.

2. Discussion

Conventionally, an abnormality-monitoring circuit, often referred to as a watchdog-timer circuit, is disposed in an electronic control unit to detect abnormal operation of a control unit microprocessor due to infinite looping of a program therein.

Such an abnormality-monitoring circuit outputs an actuating pulse signal, or "watchdog pulse," to the processor at a fixed-time interval during processor program execution, and clocks an output interval of this actuating pulse signal. When the clocked time reaches a time established to be longer than the fixed-time interval, the abnormality-monitoring circuit outputs a reset signal to reboot the microprocessor.

However, such an abnormality-monitoring circuit can not detect its own malfunction. Therefore, if the abnormality-monitoring circuit fails, it becomes impossible to prevent abnormal operation of the control unit.

In this regard, an apparatus has been described, for example, in Japanese Patent Application Laid-open No. Hei 6-301574, and in Japanese unexamined patent publication No. Hei 5-14281, for detecting malfunction of an abnormality-monitoring circuit. Namely, before the power to an electronic control unit is switched on and a processing unit begins to run a control program, the processing unit is caused to stop, for a predetermined time, and output an actuating pulse signal to an abnormality-monitoring circuit. When no reset signal is output to the abnormality-monitoring circuit within this predetermined time, the abnormality-monitoring circuit is determined to have malfunctioned.

Meanwhile, a processing unit as described, for example, in Japanese Patent Application Laid-open No. Hei 4-369740, detects a clock time in an abnormality-monitoring circuit at least twice within a generation cycle of an actuating pulse signal, and determines the abnormality-monitoring circuit to be malfunctioning when the present detected value is less than the previous detected value.

However, the related art of the above-described Japanese Patent Application Laid-open No. Hei 6-301574 and in Japanese unexamined patent publication No. Hei 5-14281 inspects the operability of the abnormality-monitoring circuit only upon start-up of the electronic control unit. In a case where malfunction occurs in the abnormality-monitoring circuit during actual processing by the processing unit, it is impossible to detect the malfunction and take appropriate action. As extremely high control safety has come to be demanded in recent years, for example, for a vehicle electronic control unit that controls a vehicle engine, and improvement of control safety reached a ceiling with the above-described related art.

Meanwhile, although the art described in the foregoing Japanese Patent Application Laid-open No. Hei 4-369740 can detect an malfunction in an abnormality-monitoring circuit in real time, whether the abnormality-monitoring circuit has truly clocked a time longer than the generation cycle of the actuating pulse signal cannot be determined. For this reason, malfunction in the abnormality-monitoring circuit cannot reliably be detected. Also, the processing unit must detect a clocked time in the abnormality-monitoring circuit within the generation cycle of the actuating pulse signal at least twice, and the processing load in the processing unit becomes extremely large.

SUMMARY OF THE INVENTION

In light of such problems, it is an object of this invention to provide an apparatus and method to reliably detect a malfunction in an abnormality-monitoring circuit during operation of a processing unit.

In particular, the present invention detects malfunction of an abnormality monitoring circuit in an electronic control unit (ECU). The ECU includes a processing unit actuated in accordance with a stored program to output an actuating pulse signal within a fixed-time interval, and an abnormality-monitoring circuit to clock an output interval of the actuating pulse signal from the processing unit, and to output a reset signal to the processing unit when the clocked time reaches a defined time established to be longer than the fixed-time interval.

The present invention first determines whether a predetermined inspection-execution condition has been fulfilled during operation of the processing unit. If so, the invention prohibits the processing unit from outputting a subsequent actuating pulse signal, until at least a predetermined time has elapsed when the inspection-execution condition is determined to have been fulfilled. Further, the present invention determines malfunction of the abnormality-monitoring circuit when the clocked time in the abnormality-monitoring circuit is detected before the processing unit outputs the actuating pulse signal, and the detected clocked time has not reached an established reference value when output prohibition of said actuating pulse signal by said prohibiting means has been released.

DETAILED DESCRIPTION OF THE PRESENT INVENTION

An embodiment of this invention will be described hereinafter with reference to the drawings. It is a matter of course that this invention is not exclusively limited to the embodiment described hereinafter, and may employ various embodiments which do not depart from the technical scope of this invention.

Figure 1:
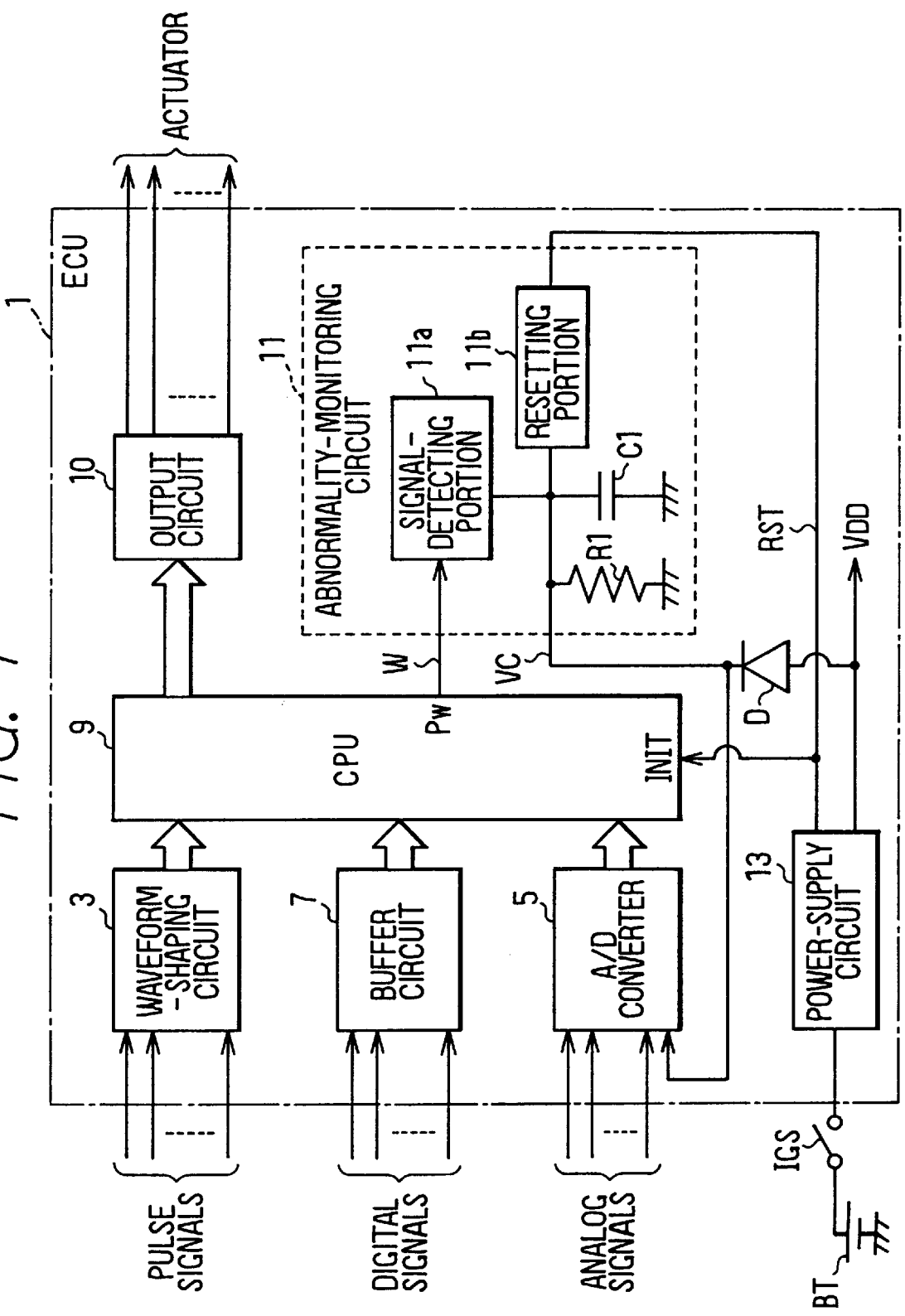
FIG. 1 is a block diagram depicting the structure of an electronic control unit (ECU) according to the present invention.

FIG. 1 is a block diagram showing the structure of an electronic control unit (hereinafter termed an ECU) 1 that controls operation of an automotive internal combustion engine.

As shown in FIG. 1, the ECU 1 is provided with several components as will now be described. A waveform-shaping circuit 3 inputs and pulses signals from a speed sensor to detect engine speed. A vehicle-speed sensor detects vehicle speed and performs waveform shaping of these pulse signals. An analog-to-digital (A/D) converter 5 inputs analog signals from a pedal-opening sensor to detect the degree of depression of an accelerator pedal. A throttle-opening sensor detects throttle opening, and converts these analog signals to digital signals. A buffer circuit 7 inputs digital signals from various sensors, switches, and the like other than the foregoing, for detecting a running state of the engine and for performing noise removal and conversion of voltage levels. A microprocessor (hereinafter "CPU") 9 functions as a processing unit to compute a target throttle opening, fuel-injection quantity, ignition timing, and so on for the engine based on the signals from the waveform-shaping circuit 3, the A/D converter 5, and the buffer circuit 7, and to output control signals based on the computational results thereof. An output circuit 10 receives the control signals from the CPU 9 and drives various actuators, such as a throttle motor to regulate the throttle opening, an injector for fuel-injection use, and an igniter for fuel-ignition use.

Here, as will be described later, the CPU 9 inverts the output level of an output port PW of the CPU 9 each time the CPU 9 executes a program for engine control stored in a ROM within the CPU 9. Due to this, an actuating signal W output from the output port PW falls each fixed-time interval.

The ECU 1 is also provided with an abnormality-monitoring circuit 11, or watchdog-timer circuit, that receives the actuating signal W output from the CPU 9 and clocks the fall interval of this actuating signal W. When this clocked time interval reaches a defined time set to be longer than the foregoing fixed-time interval, the ECU determines that an abnormality such as a program infinite loop or the like has occurred in the CPU 9, and outputs a low-active reset signal RST to a reset pin INIT of the CPU 9. The ECU is also provided with a power-supply circuit 13 to receive electrical power supplied via an ignition switch IGS for the vehicle from a battery BT mounted on the vehicle and supply power-supply voltage VDD for actuating use (according to this embodiment, 5 V) to the CPU 9 and peripheral circuitry thereof (the waveform-shaping circuit 3, the A/D converter 5, the buffer circuit 7, the abnormality-monitoring circuit 11, and so on).

When the ignition switch IGS is switched on from the off state and power is applied to the ECU 1, the power-supply circuit 13 also performs what is known as a power-on reset, outputting the reset signal RST to the reset pin INIT of the CPU 9 during an interval from that time until the time when the power-supply voltage VDD to the CPU 9 and the like is considered to have stabilized. Further, the power-supply also initially charges a capacitor C1 to the power-supply voltage VDD via a diode D. This capacitor C1 is provided in the abnormality-monitoring circuit 11 and will be described later.

The circuit structure of the abnormality-monitoring circuit 11 will be described next with reference to FIGS. 1 and 2.

As shown in FIG. 1, the abnormality-monitoring circuit 11 includes the capacitor C1 to clock the fall interval of the actuating signal W output from the CPU 9 as charge voltage. A discharge-use resistor R1 is connected in parallel with the capacitor C1 to gradually discharge the charge of the capacitor C1 to ground potential (0 V). A signal-detecting portion 11a charges the capacitor C1 to the power-supply voltage VDD each time the actuating signal W from the CPU 9 falls. Also, a resetting portion 11b outputs a single reset signal RST to the reset pin INIT of the CPU 9 and reboots the CPU 9 from an initial state when the charging voltage (that is, voltage opposite to the ground potential of the capacity C1) VC of the capacitor C1 drops to a defined value corresponding to the above-described defined time.

In the ECU 1 according to this embodiment, the CPU 9 monitors the charging voltage VC of the capacitor C1 via the A/D converter 5.

Figure 2:
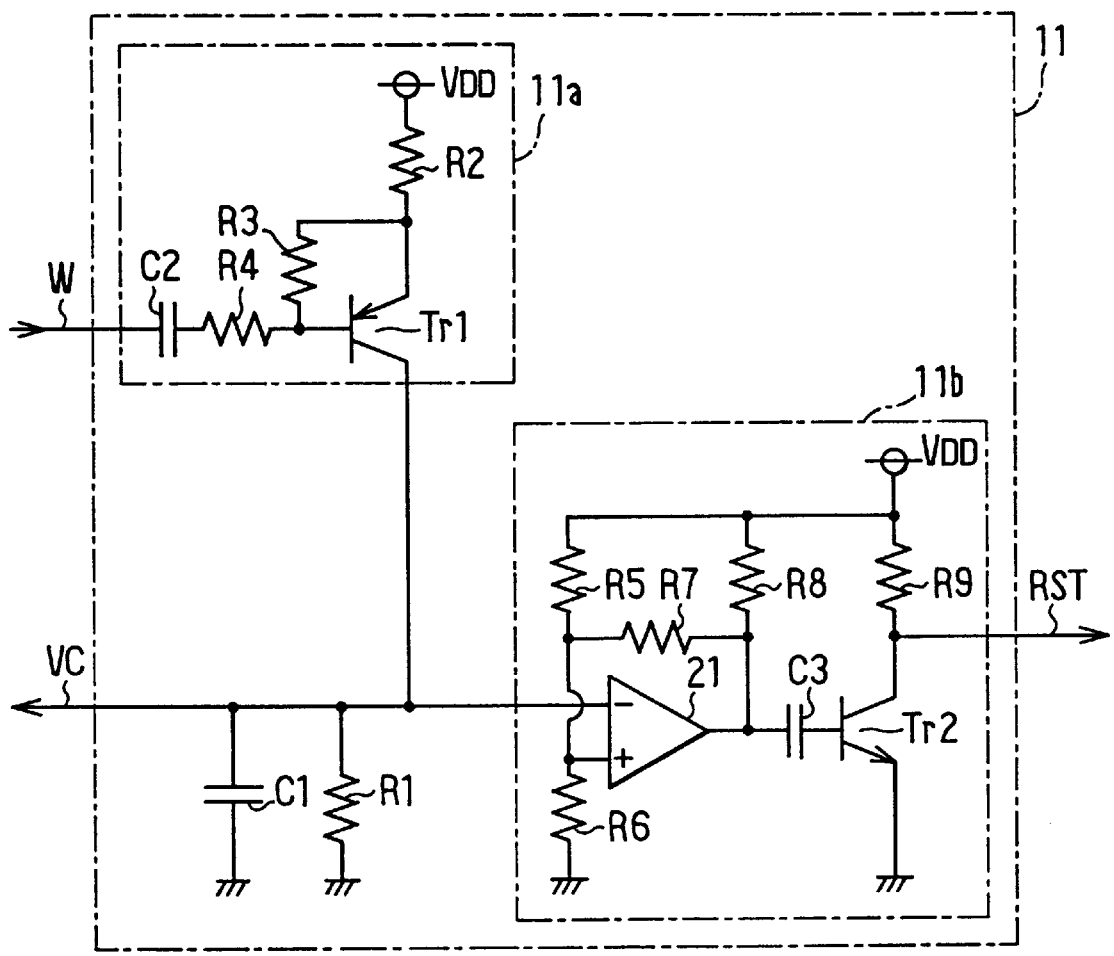
FIG. 2 is a circuit diagram depicting the structure of an abnormality-monitoring circuit.

As shown in FIG. 2, the signal-detecting portion 11a is made up of a PNP transistor Tr1 for charging use having a collector connected to the end of the capacitor C1 opposite to ground potential. A resistor R2 is for charging-current restricting use. One end of the resistor R2 is connected to the emitter of the PNP transistor Tr1, while the other end is connected to the power-supply voltage VDD. A resistor R3 for malfunction-prevention use is connected between the emitter and the base of the PNP transistor Tr1. A resistor R4, for base-current restricting use, has one end connected to the base of the PNP transistor Tr1. A capacitor C2 differentiates the actuating signal W from the CPU 9. One end of the capacitor C2 is connected to the end of the resistor R4 on the side opposite to the PNP transistor Tr1, and the other end is connected to the output port PW of the CPU 9.

Additionally, the resetting portion 11b includes a comparator 21 whose inversion input pin (– pin) is connected to the end of the capacitor C1 opposite to ground potential. A resistor R5 includes one end connected to the power-supply voltage VDD, with the other end being connected to a noninversion input pin (+ pin) of the comparator 21. A resistor R6 includes one end connected to the noninversion input pin of the comparator 21, with the other end being connected to ground potential. A resistor R7 is connected between an output pin and the noninversion input pin of the comparator 21 (in other words, between the mutual connection points of the above-described two resistors R5 and R6). A resistor R8 is for high-level output use, and includes one end connected to the power-supply voltage VDD, with the other end being connected to the output pin of the comparator 21. A resistor R9 for pullup use includes one end connected to the power-supply voltage VDD, with the other end being connected to the reset pin INIT of the CPU 9. An NPN transistor Tr2 is for reset-signal output use, and includes a collector connected to an end of the resistor R9 opposite to the power-supply voltage VDD (that is, to the reset pin INIT of the CPU 9), and an emitter connected to ground. A capacitor C3 is connected between the output pin of the comparator 21 and the base of the NPN transistor Tr2 to differentiate the output of the comparator 21.

Here, the output pin of the comparator 21 is of an open-collector format and is provided with the resistor R8 to make the output pin of the comparator 21 go high (5 V), that is, to output a high-level signal from the comparator 21.

The resistors R5, R6, and R7 are for applying a comparison voltage to the noninversion input pin of the comparator 21 for comparison with the charging voltage VC of the capacitor C1. Along with this, the resistors R5, R6, and R7 are for applying hysteresis to the comparator 21.

In a case where the output of the comparator 21 is low (0 V), the resistor R6 and the resistor R7 assume a mode of connection in parallel, and so the comparison voltage V1, which is the power-supply voltage VDD divided by the resistance of the resistor R5 and the parallel resistances of the resistors R6 and R7 is applied to the noninversion input pin of the comparator 21.

When the voltage of the inversion input pin of the comparator 21 (that is, the charging voltage VC of the capacitor C1) falls to a level that is lower than the above-described comparison voltage V1 and the output of the comparator 21 goes high, a comparison voltage V2 higher than the foregoing comparison voltage V1 and which is the power-supply voltage VDD divided by the resistances of the resistors R5 and R6, is applied to the noninversion input pin of the comparator 21.

For this reason, when the voltage of the inversion input pin of the comparator 21 falls lower than the foregoing comparison voltage V1, and the output of the comparator 21 changes from low to high, if the voltage of the inversion input pin of the comparator 21 does not thereafter exceed the comparison voltage V2 (>V1) which is higher than the comparison voltage V1, the output of the comparator 21 does not return to low.

The resistance of the resistor R7 is set at a value sufficiently larger than the resistances of the resistors R5 and R6. Additionally, in the description hereinafter, the above-described comparison voltage V1 is renamed the reset voltage V1 and the above-described comparison voltage V2 is renamed the reset recovery voltage V2.

Figure 7A:
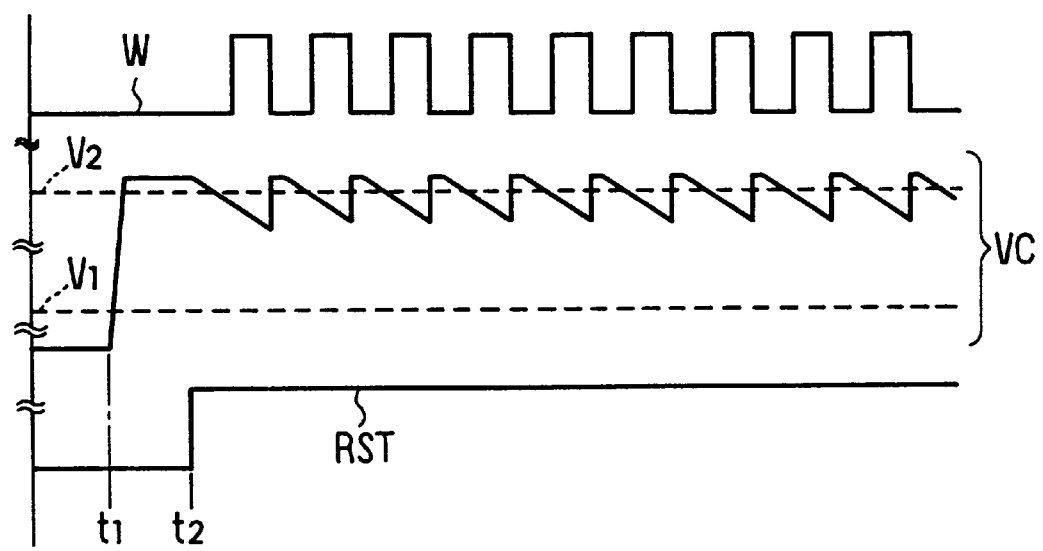
FIG. 7 is a timing diagram depicting operation of an abnormality-monitoring circuit.

In such an abnormality-monitoring circuit 11, when the ignition switch IGS is switched on at time t1, the capacitor C1 is initially charged by the power-supply circuit 13 up to the power-supply voltage VDD, as shown in FIG. 7(A). For this reason, as the ignition switch IGS is switched on, the output of the comparator 21 is initialized to low, and the above-described reset voltage V1 is applied to the noninversion input pin of the comparator 21.

Thereafter, when the power-on reset to the CPU 9 power-supply circuit 13 is released at time t2 and the reset signal RST (i.e., the voltage level of the reset pin INIT of the CPU 9) changes from low to high, the CPU 9 starts operation from an initial state and sequentially level-inverts and outputs the actuating signal W by repeatedly executing processing, as will be described later.

Thereupon, in the signal-detecting portion 11a of the abnormality-monitoring circuit 11, each time the actuating signal W from the CPU 9 falls, the PNP transistor T1 is switched on during the interval from the time of the fall thereof until the capacitor C2 is substantially fully charged. As a result, the capacitor C1 is charged to the power-supply voltage VDD through the resistor R2 and the PNP transistor Tr1. Accordingly, when the PNP transistor Tr1 is switched off, the charge of the capacitor C1 is gradually discharged at a time constant (C1×R1) with the resistor R1 until the next fall of the actuating signal W from the CPU 9, and the charging voltage VC of the capacitor C1 drops.

Accordingly, the above-described operation is repeated each time the actuating signal W from the CPU 9 falls. However, as shown for example in FIG. 7(B), after the actuating signal W has fallen in time t3, when infinite looping or the like of the program occurs in the CPU 9 and the actuating signal W is no longer output (i.e., level-inversion of the actuating signal W is no longer performed) and the defined time elapses while in this state, the charging voltage VC of the capacitor C1 becomes less than the reset voltage V1 as indicated at time t4 in FIG. 7(B). When this occurs, a single reset signal RST is output to the CPU 9 from the resetting portion 11b of the abnormality-monitoring circuit 11, as shown from time t4 to time t5 in FIG. 7(B).

That is to say, when the charging voltage VC of the capacitor C1 becomes less than the reset voltage V1, in the resetting portion 11b the output of the comparator 21 goes high and the NPN transistor Tr2 is switched on during the interval from the time thereof until the capacitor C3 is substantially fully charged. As a result, the reset pin INIT of the CPU 9 goes low and the CPU 9 is reset.

Accordingly, the CPU 9 is rebooted from an initial state by the reset signal RST from such a resetting portion 11b. When the actuating signal W again falls as shown at time t6 in FIG. 7(B), the capacitor C1 is again charged to the power-supply voltage VDD, and thereafter returns to the normal state shown in FIG. 7(A).

In this embodiment, the CPU 9 performs level inversion of the actuating signal W within at least every 100 ms, in accompaniment with repeated execution of a base routine of FIG. 3, which will be described later. Accordingly, when the CPU 9 is normal, the actuating signal W falls within at least every 200 ms, and so the resistances of the resistors R5, R6, and R7 in the abnormality-monitoring circuit 11 are set so that the foregoing reset voltage V1 becomes the charging voltage VC at the time of discharge of 250 ms, which is longer than 200 ms, after the capacitor C1 has been charged in accompaniment with the fall of the actuating signal W. That is to say, with this embodiment, the above-described fixed-time interval is 200 ms, and the above-described defined time (the interval from time t3 to time t4 in FIG. 7(B)) is set at 250 ms.

Figure 7B:
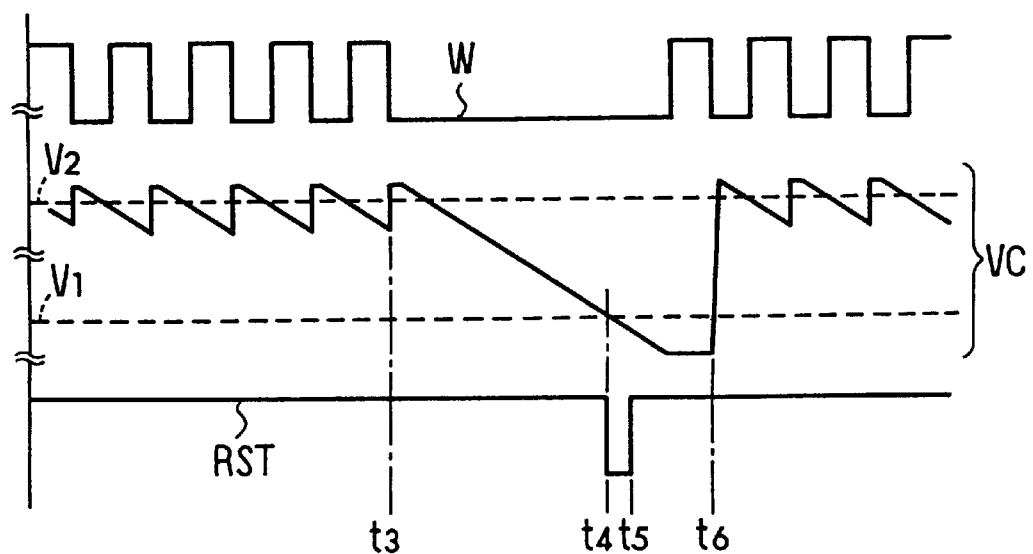

Further, when the charging voltage VC of the capacitor C1 becomes less than the reset voltage V1 at time t4 in FIG. 7(B), and the output of the comparator 21 goes high, the reset recovery voltage V2, which is higher than the reset voltage V1, is applied to the noninversion input pin of the comparator 21, as was described above. For this reason, an effect on the output of the comparator 21 can be prevented during the interval from time t4 in FIG. 7(B) until the actuating signal W falls at time t6, even if the voltage of the inversion input pin of the comparator 21 fluctuates slightly due to noise or the like.

Processing executed by the CPU 9 will be described next, with reference to the flow diagrams of FIGS. 3–6.

Figure 3:
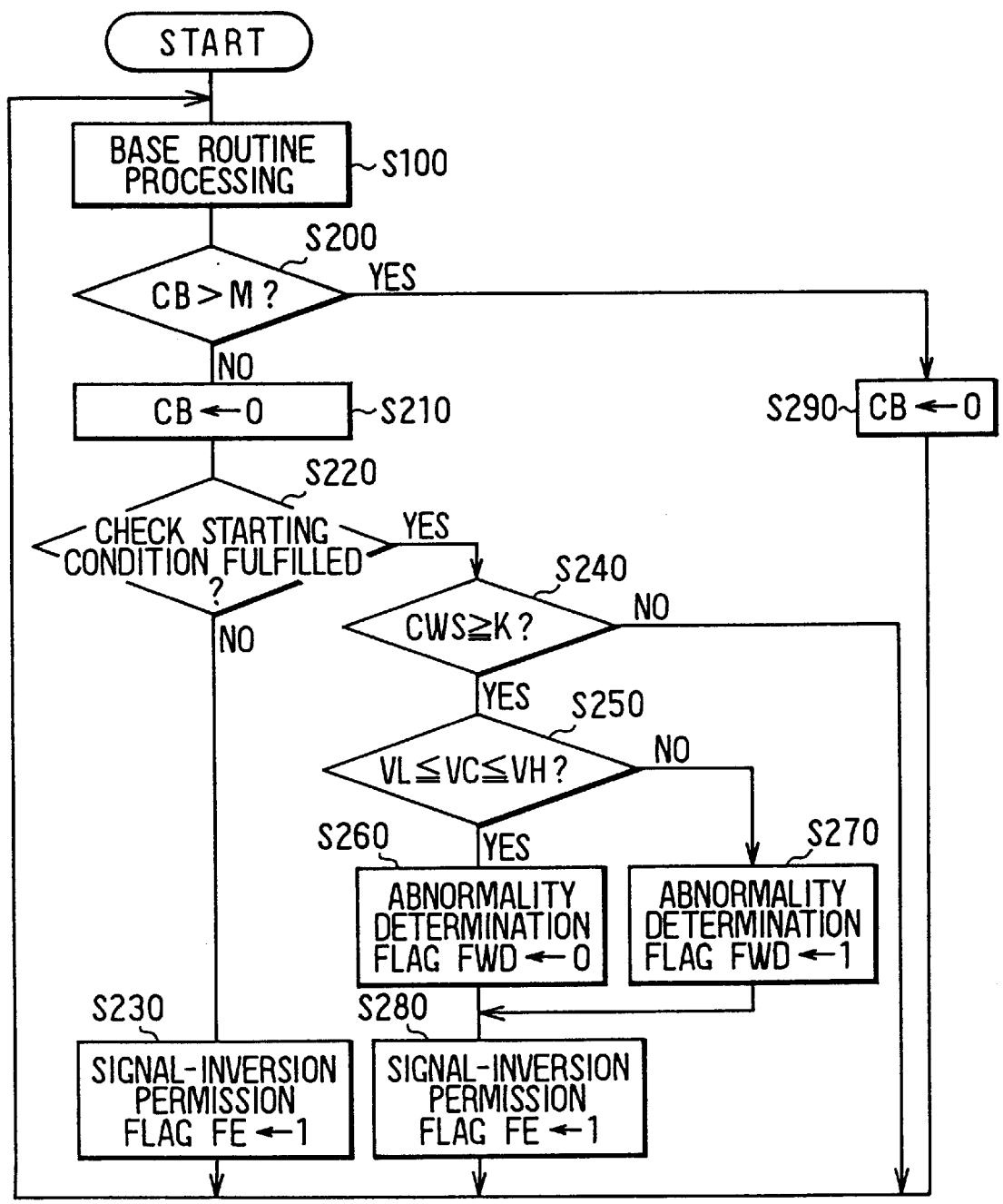
FIG. 3 is a flow diagram depicting a base routine which a microprocessor (CPU) executes.

First, FIG. 3 represents a base routine repeatedly executed by the CPU 9. When the ignition switch IGS is switched on and the power-on reset is canceled by the power-supply circuit 13, the CPU 9 executes initialization processing (not illustrated), and thereafter begins to execute the base routine of FIG. 3. Accordingly, the CPU 9 controls the engine by repeatedly executing this base routine. The time required for the CPU 9 to execute this base routine once (hereinafter termed "base cycle time") fluctuates with each execution cycle thereof according to the running state of the engine, the frequency of interrupts of other interrupt processing, and so on, and with this embodiment is a minimum of 10 ms and a maximum of 100 ms.

As shown in FIG. 3, when the CPU 9 begins to execute the base routine, first, at step (hereinafter indicated simply as "S") 100, the CPU 9 executes base-routine processing to control the engine.

It may be noted that various processing, such as fuel-injection processing to inject fuel into the engine, ignition-timing control processing to control the ignition timing of the engine, and throttle-control processing to regulate the throttle degree of opening exists as the base-routine processing. Herein, however, throttle-control processing will be described with reference to the flow diagram of FIG. 4.

In the base-routine processing of the foregoing S100, when the execution stage for throttle-control processing occurs, at S110 the CPU 9 detects the amount of depression of the accelerator pedal based on the signal from the above-described pedal-opening sensor. Next, at S120, the CPU 9 calculates a target throttle opening according to the foregoing detected amount of depression of the accelerator pedal. At S130, the CPU detects the actual throttle opening (i.e., the actual degree of opening of the throttle valve) based on the signal from the above-described throttle-opening sensor.

Next, at S140, the CPU 9 calculates a current-instruction value for the throttle motor so that the actual throttle opening detected at S130 becomes the target throttle opening calculated at S120.

Next, at S150, it is determined whether vehicle speed is 0, that is, whether the vehicle is in a stopped state. When the vehicle speed is 0, at S160 it is determined whether an abnormality-determination flag FWD is 1. This abnormality-determination flag FWD is set to 1 in a case where the abnormality-monitoring circuit 11 is determined in the base routine to be abnormal, as will be described later.

Here, where the abnormality-determination flag FWD is determined not to be 1 at S160, or where the vehicle speed is determined not to be 0 at S150, execution advances to S170. At S170, the CPU 9 outputs to the output circuit 10 a control signal corresponding to the current-instruction value calculated at S140, and drives the throttle motor so that the actual throttle opening becomes the target throttle opening. Thereafter, this throttle-control processing ends.

Meanwhile, where the abnormality-determination flag FWD is determined to be 1 at S160, execution advances to S180, the CPU 9 outputs to the output circuit 10 a control signal to stop electrical conduction to the throttle motor, and thereafter this throttle-control processing ends. That is to say, in this case, the CPU 9 stops driving the throttle motor and causes the throttle opening to assume for example a fully-open state as a failsafe measure in response to abnormality of the abnormality-monitoring circuit 11.

Accordingly, when the CPU 9 ends execution of the base-routine processing, including such throttle-control processing, at S200 it is determined whether the value of a base cycle-time counter CB to count the base cycle time (the time required to execute the base routine once) is larger than a predetermined value M, which corresponds to the maximum value (100 ms) of the base cycle time.

Figure 5A:
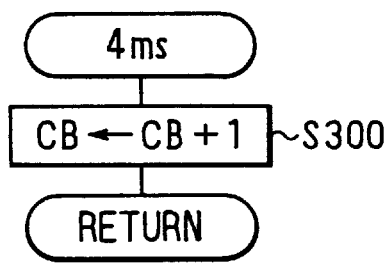
FIG. 5 is a flow diagram depicting interrupt processing which the CPU executes.

Each time interrupt processing, as shown in FIG. 5(A), is executed, the base cycle-time counter CB is incremented at S300 of the interrupt processing thereof. Accordingly, the foregoing predetermined value M is set at 25.

At S200, where the value of the base cycle-time counter CB is determined to be less than the predetermined value M, the base cycle time is less than the hypothesized maximum time of 100 ms, and the program determines that the program is being executed normally, and execution advances to S220.

At S220 it is determined whether a check-starting condition as an inspection-execution condition has been fulfilled. In a case where the check-starting condition has not been fulfilled, execution advances directly to the S230, and signal-inversion permission flag FE indicating whether the actuating signal W is to be level-inverted is set to 1, indicating that inversion is permitted. Thereafter, execution returns to S100, and the base-routine processing is executed again.

Here, the check-starting condition is a condition for inspecting whether the abnormality-monitoring circuit 11 is normal. In this embodiment, it is determined by predetermined determination processing in the base-routine processing of S100 that the amount of depression of the accelerator pedal is 0 (i.e., the accelerator pedal is full open) and that the speed of the engine is a predetermined speed or more. It is also determined that the check-starting condition has been fulfilled in a case where fuel injection to the engine has been stopped, that is, in a case where what is termed fuel cutoff during idle is performed, and the program for fuel-injection processing among the programming for engine-control use has not been executed. Moreover, in this embodiment, in a case where the check-starting condition is fulfilled, the program for fuel-injection processing is not executed at S100, and so the processing load of the CPU 9 is reduced, and the base cycle time becomes 20 ms or less.

Figure 6:
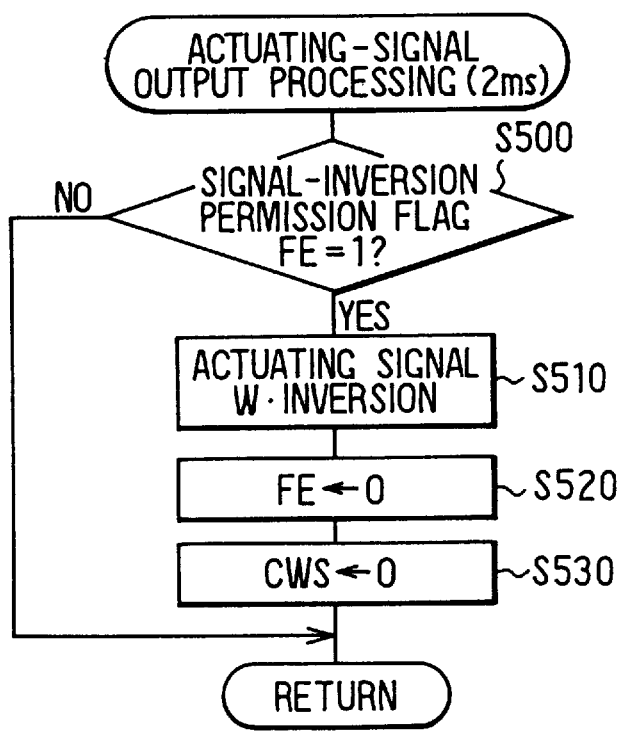
FIG. 6 is a flow diagram depicting actuating-signal output processing which the CPU executes.

Additionally, the above-mentioned signal-inversion permission flag FE is referenced by the actuating-signal output processing in FIG. 6 as interrupt processing every 2 ms.

That is to say, in the actuating-signal output processing of FIG. 6, first, at S500 it is determined whether the signal-inversion permission flag FE is 1. When the flag is not 1, this processing ends, and execution returns to the base routine. When the signal-inversion permission flag FE is 1, however, at S510 the voltage level of the actuating signal W issued from the output port PW to the abnormality-monitoring circuit 11 is inverted. Next, at S520, the signal-inversion permission flag FE is reset to 0. For this reason, when the signal-inversion permission flag FE is set to 1 by the base routine of FIG. 3, the actuating signal W to the abnormality-monitoring circuit 11 comes to be level-inverted at the timing with which the actuating-signal output processing is executed by an interrupt immediately thereafter.

Further, with the actuating-signal output processing, at S530 the value of a signal stop-time counter CWS is cleared to 0. The signal stop-time counter CWS is for counting time to deliberately cause level inversion of the actuating signal W to stop. Thereafter, the processing ends, and execution returns to the base routine.

Figure 5B:
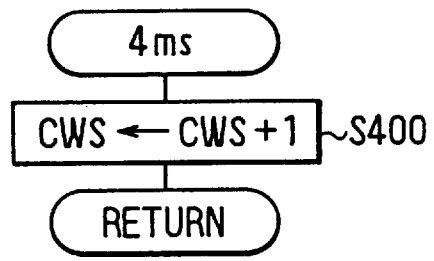

Each time interrupt processing of every 4 ms shown in FIG. 5(B) is executed, the signal stop-time counter CWS is incremented at S400 of the interrupt processing thereof. Accordingly, the signal stop-time counter CWS is cleared to 0 each time the actuating signal W is level-inverted, along with being incremented by one at each elapse of 4 ms.

Meanwhile, in a case where the check-starting condition is determined at S220 of the base routine to have been fulfilled, execution advances to S240.

At S240, it is determined whether the above-described signal stop-time counter CWS is a predetermined value K or more. When the signal stop-time counter CWS does not equal the predetermined value K or more, execution returns directly to S100 without setting the signal-inversion permission flag FE to 1, and the base routine is executed again. In this embodiment, the predetermined value K is set at 15. For this reason, in a case where the check-starting condition is determined at S220 to have been fulfilled, the subsequent level inversion of the actuating signal W is prohibited from the time of the previous level inversion of the actuating signal W at least until the elapse of 60 ms (15×4 ms) whereat the value of the signal stop-time counter CWS becomes 15.

In contrast thereto, in a case where the signal stop-time counter CWS is determined at S240 to be the predetermined value K or more, execution advances to S250.

At S250, the charging voltage VC of the capacitor C1 is detected based on the digital signal from the A/D converter 5. Further, it is determined whether this detected charging voltage VC is within a reference range from an established high-potential-side reference value VH to a low-potential-side reference value VL which is lower than this high-potential-side reference value VH (refer to FIG. 8).

Accordingly, in a case where the charging voltage VC of the capacitor C1 is determined at S250 to be within the foregoing reference range, the abnormality-monitoring circuit 11 is determined to be normal, execution advances to S260, and the above-described abnormality-determination flag FWD is set to 0 to indicate that the abnormality-monitoring circuit 11 is normal.

Figure 4:
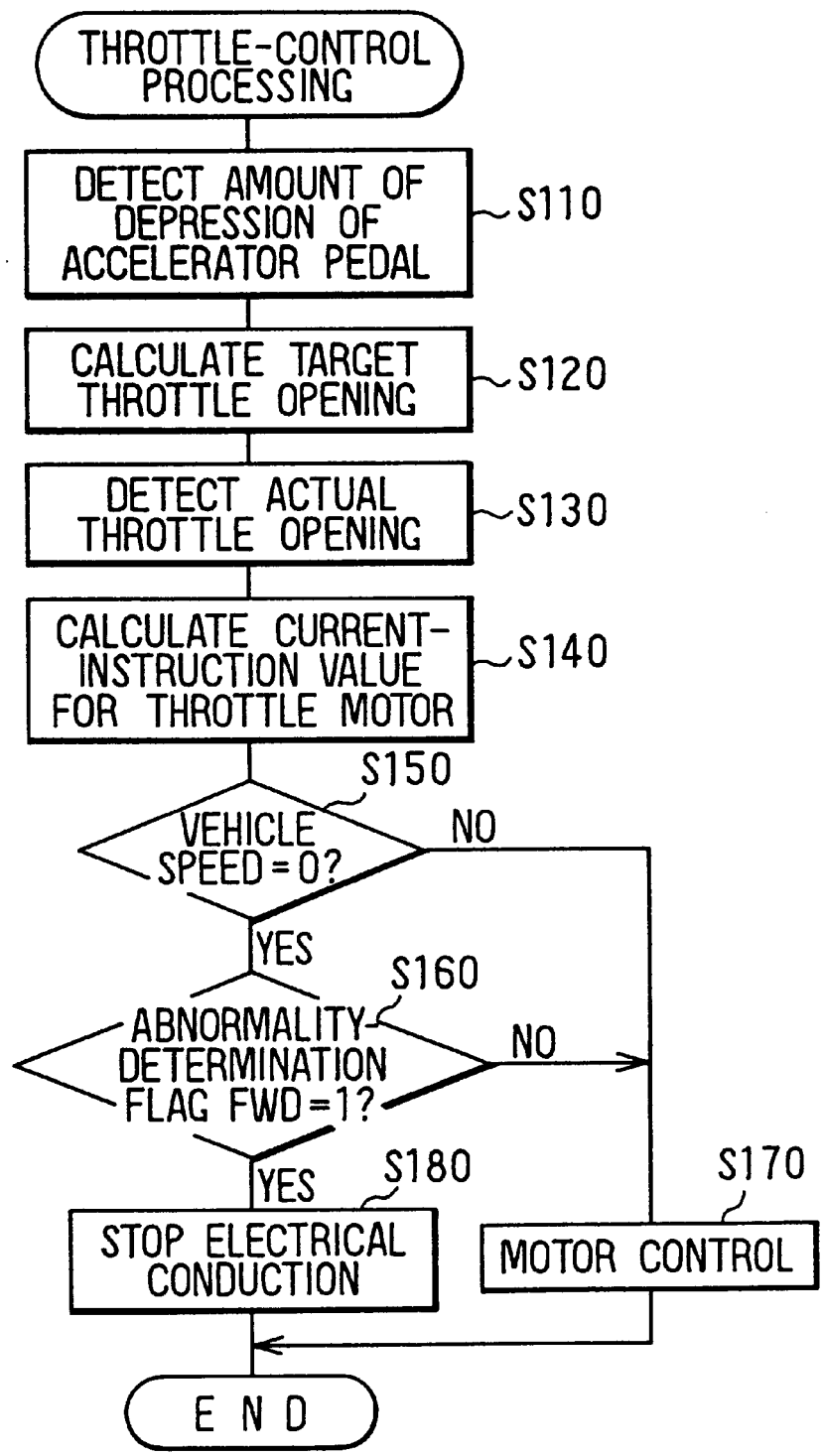
FIG. 4 is a flow diagram depicting throttle-control processing which the CPU executes within the base routine.

Meanwhile, in a case where the charging voltage VC of the capacitor C1 is determined at S250 not to be within the foregoing reference range, the abnormality-monitoring circuit 11 is determined to be abnormal, execution advances to S270, and the above-described abnormality-determination flag FWD is set to 1 to indicate that the abnormality-monitoring circuit 11 has malfunctioned. Along with this, a warning light (not illustrated) is illuminated to notify the vehicle driver of the occurrence of the malfunction. When the abnormality-determination flag FWD is set to 1 at S270, the throttle opening assumes a fully closed state and the engine stops at the time when the vehicle speed becomes 0, due to the above-described throttle-control processing (FIG. 4).

Accordingly, after either S260 or S270 has been executed, execution advances to S280 and the signal-inversion permission flag FE is set to 1 to indicate that inversion is permitted. Thereafter, execution returns to S100, and the base-routine processing is executed again.

Here, in this embodiment, the high-potential-side reference value VH and the low-potential-side reference value VL are established as will be described hereinafter.

First, in a case where the check-starting condition is determined at S220 to have been fulfilled, the time interval at which the actuating signal W is level-inverted is longer than at least 60 ms.

Briefly, whereas the processing load of the CPU 9 is reduced and the base cycle time becomes 20 ms or less where the check-starting condition is determined at S220 to have been fulfilled, the subsequent level inversion of the actuating signal w is prohibited from the time of the previous level inversion of the actuating signal w at least until the elapse of 60 ms (15×4 ms) whereat the value of the signal stop-time counter CWS becomes 15, due to the determination processing at S240.

For this reason, the value of the signal stop-time counter CWS is determined at S240 of the base routine to be the predetermined value K (15) or more. The charging voltage VC of the capacitor C1 detected in the following S250 should become at least the charging voltage VC at the time when the capacitor C1 is discharged for 60 ms after charging accompanying the fall of the actuating signal W (hereinafter, the charging voltage VC at this time will be indicated as "VC [t=60 ms]"), or lower than this VC [t=60 ms].

Accordingly, in this embodiment the high-potential-side reference value VH is set at the above-described VC [t=60 ms].

Next, where the check-starting condition is determined at S220 to have been fulfilled, the maximum time of the fall interval of the actuating signal W is 180 ms.

Figure 8:
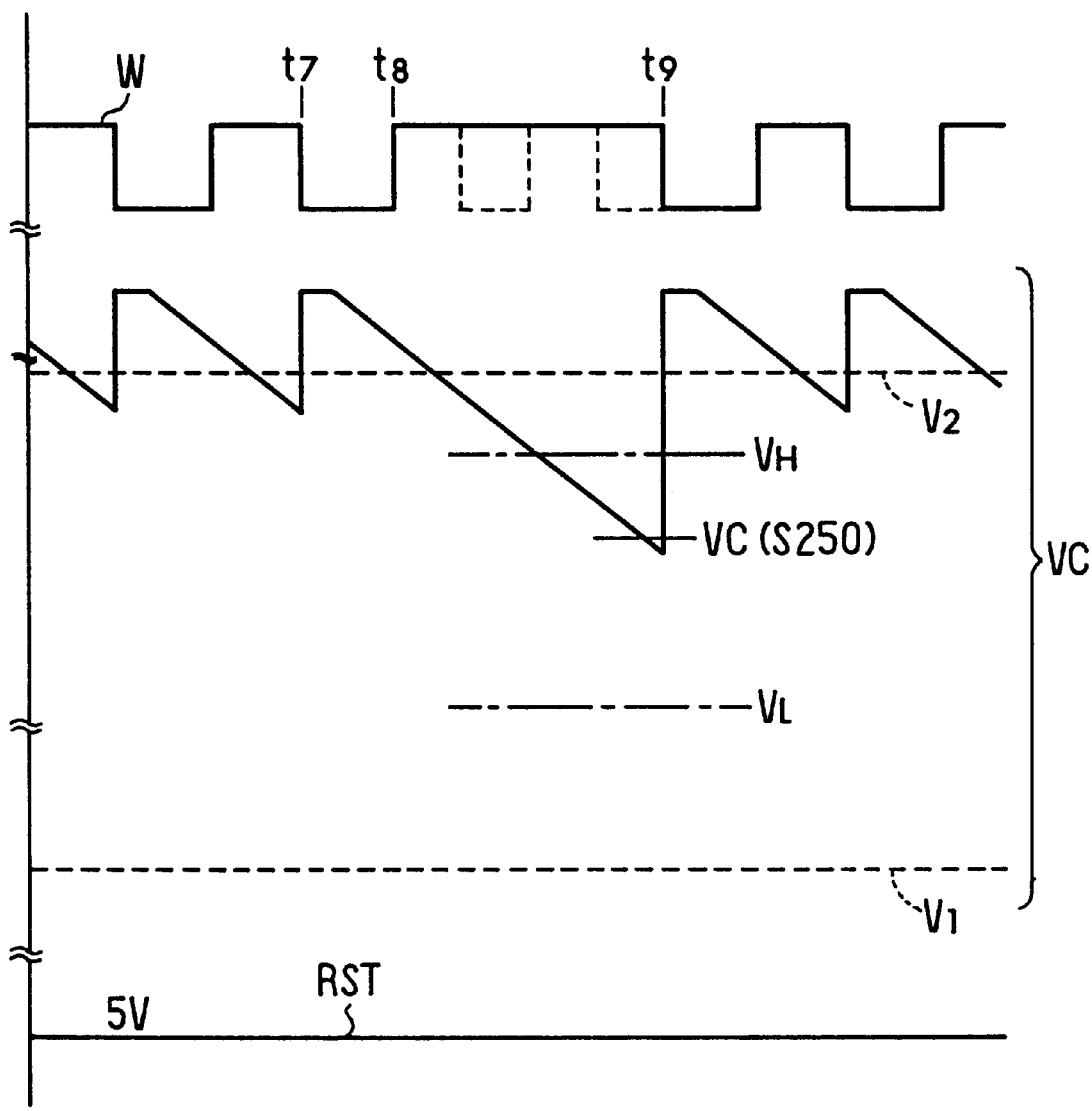
FIG. 8 is a timing diagram describing abnormality-detection operation for an abnormality-monitoring circuit.

An exemplary case where the fall interval of the actuating signal W becomes the maximum when the check-starting condition is fulfilled is shown in FIG. 8, wherein time from the fall of the actuating signal W at time t7 until rise at time t8 becomes 100 ms, which is ordinarily the maximum value of the base cycle time. Further, the check-starting condition is fulfilled at S220 of the base routine after the actuating signal W has fallen at time t8. In this case, the maximum time after the actuating signal W rises at time t8 and until the actuating signal W falls at time t9 is 80 ms (60 ms+20 ms), obtained by adding the 20 ms, which is the maximum value of the base cycle time during fulfillment of the check-starting condition, to the 60 ms at which the value of the signal stoptime counter CWS becomes 15. Accordingly, the maximum time after the actuating signal W falls at time t7 until the actuating signal W again falls at time at time t9 becomes 180 ms (100 ms+80 ms).

For this reason, the signal stop-time counter CWS is determined at S240 of the base routine to be the predetermined value K (15) or more, and the charging voltage VC of the capacitor C1 detected at S250 should not be lower than the charging voltage at the time when the capacitor C1 is discharged for 180 ms after charging accompanying the fall of the actuating signal W (hereinafter, the charging voltage VC at this time will be indicated as "VC [t=180 ms]").

Accordingly, in this embodiment the low-potential-side reference value VL is set at the above-described VC [t=180 ms].

Meanwhile, as shown in FIG. 3, where the value of the base cycle-time counter CB is determined at S200 of the base routine to be larger than the predetermined value M, execution is transferred to S290. At S290, the value of this base cycle-time counter CB is cleared to 0 and execution returns to S100. Accordingly, when this state continues, the actuating signal W from the CPU 9 comes not to be level-inverted, and so eventually a reset signal RST is output from the abnormality-monitoring circuit 11, and the CPU 9 is reset.

That is to say, in a case where the value of the base cycle-time counter CB is determined at S200 to be larger than the predetermined value M, the base cycle time is longer than the hypothesized maximum time of 100 ms. The program therefore determines that some abnormality has occurred in the program processing path, and stops the level inversion of the actuating signal W. The program is then reset by the abnormality-monitoring circuit 11.

With this embodiment, at the falling edge of the actuating signal W, the CPU 9 output corresponds to the actuating pulse signal. In the base routine of FIG. 3, S220 corresponds to the inspection-condition determining means, S240 corresponds to the output-prohibiting means, and S250 through S270 correspond to the abnormality-determining means. Further, the high-potential-side reference value VH corresponds to the reference value employed in determination by the abnormality-determining means and the low-potential-side reference value VL corresponds to the upper-limit value employed in determination by the abnormality-determining means.

In the ECU 1 of this embodiment as has been described in detail above, the CPU 9 sets the signal-inversion permission flag FE to 1 each time the CPU 9 executes the base routine of FIG. 3, and level-inverts the actuating signal W to the abnormality-monitoring circuit 11 (S230). However, when the check-starting condition is determined to have been fulfilled (S220: YES), the setting of the signal-inversion permission flag FE to 1 is stopped, and the subsequent level inversion of the actuating signal W is prohibited until the elapse of 60 ms (15×4 ms) whereat the value of the signal stop-time counter CWS becomes 15 after the previous level inversion of the actuating signal W (S240: NO).

Accordingly, when the CPU 9 determines that the value of the signal stop-time counter CWS has become 15 or more (S240: YES), then before the signal-inversion permission flag FE is set to 1 (S280), the charging voltage VC of the capacitor C1 of the abnormality-monitoring circuit 11 is detected. When this detected charging voltage VC is not within the reference range from the high-potential-side reference value VH to the low-potential-side reference value VL (S250: NO), the abnormality-monitoring circuit 11 is determined to have malfunctioned (S270).

For this reason, with the ECU 1 of the present embodiment, when the check-starting condition is fulfilled, a subsequent fall of the actuating signal W is inhibited until at least 60 ms elapses after the previous fall of the actuating signal W. Accordingly, the charging voltage VC of the capacitor C1 before the subsequent fall of the actuating signal W after this signal inhibition is canceled is detected. When this charging voltage VC is not within the above-described reference range, the abnormality-monitoring circuit 11 is determined to have malfunctioned.

For example, when the base cycle time continuously is at the minimum value of 10 ms, even in a situation where the fall interval of the actuating signal W originally would become 20 ms, when the check-starting condition is determined to have been fulfilled at S220 after the actuating signal W has fallen at time t8, level inversion of the actuating signal W is prohibited until 60 ms or more elapses, as is shown by the dotted lines in the uppermost portion of FIG. 8. As a result, the fall interval of the actuating signal W shown in the period from time t7 until time t9 becomes at least 60 ms or more. Accordingly, immediately before the actuating signal W falls at time t9, the charging voltage VC of the capacitor C1 is detected at S250 of the base routine. When this detected charging voltage VC (indicated as "VC (S250)" in FIG. 8) is within the reference range of from the high-potential-side reference value VH to low-potential-side reference value VL, the abnormality-monitoring circuit 11 is determined to be normal. Otherwise, the abnormality-monitoring circuit 11 is determined to be malfunctioning.

Therefore, according to the ECU 1 of this embodiment, the CPU 9 can reliably detect, during processing, when an abnormality occurs in the capacitor C1, the discharge-use resistor R1, or the like. When it becomes impossible for the abnormality-monitoring circuit 11 to normally clock the fall interval of the actuating signal W, the CPU can subsequently perform failsafe measures.

Additionally, with the ECU 1 of this embodiment, inspection operation of the abnormality-monitoring circuit 11 (i.e., the processing of S240 through S270 of FIG. 3) is performed only in a case where a predetermined check-starting condition has been fulfilled. Moreover, it is sufficient to detect the charging voltage VC of the capacitor C1 of the abnormality-monitoring circuit 11 only once in the base routine, and so the processing load of the CPU 9 for performing inspection of the abnormality-monitoring circuit 11 can be suppressed to a minimum.

Furthermore, with this embodiment, the check-starting condition is fulfilled at a predetermined time of minimal processing load, when fuel cutoff during idle is performed, and programming for fuel-injection processing is not being executed, so the processing load of the CPU 9 can be further reduced.

In particular, with this embodiment, in a case where the CPU 9 itself prohibits the subsequent fall of the actuating signal W and the charging voltage VC of the capacitor C1 of the abnormality-monitoring circuit 11 has not dropped to the high-potential-side reference value VH, the abnormality-monitoring circuit 11 is determined to be abnormal. For this reason, it can be inspected whether the abnormality-monitoring circuit 11 can truly clock longer times. The abnormality-monitoring circuit 11 can thus be reliably inspected.

For example, a structure may be considered wherein the CPU 9 merely checks solely the charging voltage VC of the capacitor C1 immediately before each fall of the actuating signal W to the abnormality-monitoring circuit 11, without performing processing at S240. When structured in this fashion, however, in a case where the abnormality-monitoring circuit 11 is inspected solely in a case of minimal processing load of the CPU 9, as in this embodiment in particular, the time until the charging voltage VC of the capacitor C1 is detected after the actuating signal W falls becomes extremely short, and results in the following drawbacks.

First, in a case of light processing load of the CPU 9, the base cycle time is shortened and in accompaniment thereto the fall interval of the actuating signal W also is shortened. When this occurs, it becomes impossible to reliably inspect whether the abnormality-monitoring circuit 11 truly has clocked a time longer than the fall interval of the actuating signal W.

Next, when the time until the charging voltage VC of the capacitor C1 is detected after the actuating signal W falls becomes short, it becomes difficult to distinguish minute change in the charging voltage VC. For this reason, it becomes necessary to use a device of extremely high resolution, such as the A/D converter 5.

In contrast, according to the present embodiment, the timing of the fall of the actuating signal W is deliberately delayed, and inspection of the abnormality-monitoring circuit 11 is performed. Therefore, the above-described drawbacks can be eliminated.

Meanwhile, with this embodiment, the abnormality-monitoring circuit 11 is determined to be abnormal not only in a case where the charging voltage VC detected at S250 has not dropped to the high-potential-side reference value VH, but also in a case where this charging voltage VC has dropped to exceed the low-potential-side reference value VL established in correspondence with the maximum time (180 ms) of the fall interval of the actuating signal W when the check-starting condition is fulfilled.

For this reason, even when the abnormality-monitoring circuit 11 clocks the fall interval of the actuating signal W to be longer than the true value, and specifically in a case where the charge of the capacitor C1 is discharged more rapidly than normally, or the charging voltage VC of the capacitor C1 does not rise, this abnormality can reliably be detected.

Further, with this embodiment, level inversion of the actuating signal W is prohibited within a range where the fall interval of the actuating signal W becomes shorter than 250 ms (that is, the time at which, when reached, the abnormality-monitoring circuit 11 outputs the reset signal RST to the CPU 9). Specifically, the fall interval of the actuating signal W becomes 180 ms or less even in a case where the check-starting condition has been fulfilled at S220. Therefore, in a case where inspection of the abnormality-monitoring circuit 11 is performed, no reset signal RST is output from the abnormality-monitoring circuit 11, and no impediment is placed on the CPU.

The above-described embodiment utilizes a device as the abnormality-monitoring circuit 11 structured so that the charge of the capacitor C1 is gradually discharged as time elapses, and the capacitor C1 is charged to return the load to the initial quantity each time the actuating signal W from the CPU 9 falls. However, a device structured so that the capacitor C1 is gradually charged as time elapses, and the capacitor C1 is discharged to return the load to the initial quantity each time the actuating signal W from the CPU 9 falls, may be utilized as an abnormality-monitoring circuit. Such an abnormality-monitoring circuit is described, for example, in Japanese Patent Application Laid-open No. Sho 60-84644.

Accordingly, even when either of the above-described abnormality-monitoring circuits is utilized, malfunction of this abnormality-monitoring circuit can reliably be detected while maintaining the compact feature of the capacitor.

Additionally, the abnormality-monitoring circuit is not exclusively restricted to a capacitive-type device, but may utilize a device that clocks the output interval of a actuating pulse signal from a processing unit via a clock counter, as is described in Japanese Patent Application Laid-open No. Hei 4-369740. In the case of an abnormality-monitoring circuit provided with a clock counter of this type, it is sufficient to utilize a structure such that the CPU 9 detects the count value of the foregoing clock counter as the clock time in the abnormality-monitoring circuit, and determines whether the abnormality-monitoring circuit is normal based on this detected count value.

Meanwhile, with the above-described embodiment, when the check-starting condition is determined to have been fulfilled, in order to make the fall interval of the actuating signal W become at least 60 ms or more, subsequent level inversion of the actuating signal W is prohibited until the value of the signal stop-time counter CWS becomes 15 or more after the actuating signal W was previously level inverted. However, modification as in (1) or (2) hereinafter is also acceptable.

(1) In a case where the check-starting condition is determined at S220 to have been fulfilled, it is further determined whether the actuating signal W presently being output is high, and execution is transferred to S240 solely when high. Otherwise, execution advances directly to S230. That is to say, the determination at S240 is performed solely in a case where the actuating signal W has been made to fall from high to low.

(2) Accordingly, in the actuating-signal output processing of FIG. 6, the value of the signal stop-time counter CWS is cleared to 0 at S530 solely in a case where the actuating signal W has been inverted from high to low at S510.

When modified as in the foregoing (1) or (2), where the check-starting condition has been fulfilled, a subsequent fall of the actuating signal W after the previous fall of the actuating signal W comes to be prohibited until the value of the signal stop-time counter CWS becomes 15 or more, without prohibiting a rise of the actuating signal W. Additionally, the processing of S250 of FIG. 3 is performed solely immediately before the actuating signal W falls.

Accordingly, even when modified in this way, when the check-starting condition is fulfilled, the subsequent fall of the actuating signal W is prohibited until at least 60 ms elapses after the previous fall of the actuating signal W, similarly to the above-described embodiment. For this reason, the above-described several effects can be obtained. Moreover, in a case of performing inspection of the abnormality-monitoring circuit 11, the range of fluctuation of the fall interval of the actuating signal W is narrowed, and so the reference range from the high-potential-side reference value VH to the low-potential-side reference value VL can be set to a narrow range, and determination of the acceptability of the abnormality-monitoring circuit 11 can be performed with higher accuracy.

What is claimed is:

1. An apparatus for detecting malfunction of an abnormality monitoring circuit in an electronic control unit having a processing unit actuated in accordance with a stored program to output an actuating pulse signal within a fixed-time interval, and an abnormality-monitoring circuit to clock an output interval of said actuating pulse signal from said processing unit, and output a reset signal to said processing unit when said clocked time reaches a defined time established to be longer than said fixed-time interval, said apparatus comprising:

means for determining whether a predetermined inspection-execution condition has been fulfilled during operation of said processing unit;

means for prohibiting said processing unit from outputting a subsequent actuating pulse signal until at least a predetermined time has elapsed when said inspection-execution condition is determined by said condition-determining means to have been fulfilled; and means for determining malfunction of said abnormality-monitoring circuit when said clocked time in said abnormality-monitoring circuit is detected before said processing unit outputs said actuating pulse signal, and said detected clocked time has not reached an established reference value when output prohibition of said actuating pulse signal by said prohibiting means has been released.

2. The apparatus of claim 1, wherein said prohibiting means inhibits output of said actuating pulse signal within a range wherein an output interval of said actuating pulse signal becomes shorter than said defined time.

3. The apparatus of claim 1, wherein said abnormality determining means determines the malfunction in said abnormality-monitoring circuit when said detected clocked time is not within a reference range from said reference value to an upper-limit value established in correspondence with a maximum output interval of said actuating pulse signal in a case when said inhibiting means has inhibited said actuating pulse signal.

4. The apparatus of claim 1, wherein said condition-determining means, said inhibiting means, and said abnormality-determining means are provided in said processing unit; and said condition-determining means determines that said inspection-execution condition has been fulfilled during a predetermined period of minimum processing.

5. The apparatus of claim 4, wherein said abnormality-monitoring circuit includes a capacitor that discharges or charges as time elapses, said circuit clocking an output interval of said actuating pulse signal as charge voltage of said capacitor, and outputting said reset signal when said capacitor is charged to a defined value corresponding to said defined time by returning said capacitor to an initial charge each time said actuating pulse signal is output from said processing unit; and said abnormality-determining means detects a charge voltage of said capacitor as said clocked time and determines whether said abnormality-monitoring circuit is normal on a basis of said detected charge voltage.

6. An electronic control unit, comprising:

a central processor programmed to perform a predetermined control function; and a watchdog-timer circuit that is operative to clock an output interval of an actuated pulse signal output from the processor during execution of the control function, and to output a reset signal to the processor if the actuated pulse signal is received after a predetermined time interval;

the central processor also being programmed to detect a watchdog circuit inspection condition, to inhibit subsequent actuating pulse signal output if the watchdog circuit inspection condition exists, and to detect an abnormality at the watchdog circuit if the clocked output interval does not correspond to a predetermined reference value during the subsequent actuating pulse signal inhibition.

7. The control unit of claim 6, wherein the processor is further programmed to initiate a failsafe control program if an abnormality is detected at the watchdog circuit.

8. The control unit of claim 6, wherein the processor is operative to initiate the watchdog circuit inspection condition program only when a minimum processing load condition exists.

9. A method for detecting that an abnormality-monitoring circuit in an electronic control unit has malfunctioned, said electronic control unit including a processing unit actuated in accordance with a stored program to output an actuating pulse signal within a fixed-time interval, said abnormality-monitoring circuit being operative to clock an output interval of said actuating pulse signal from said processing unit, and to output a reset signal to said processing unit when said clocked output interval reaches a pre-determined limit, the method comprising the steps of:

inhibiting output of a subsequent actuating pulse signal from said processing unit after said processing unit has output said actuating pulse signal until at least a predetermined time has elapsed when a predetermined inspection-execution condition has been fulfilled during operation of said processing unit; and subsequently determining that said abnormality-monitoring circuit has malfunctioned when said clocked output interval in said abnormality-monitoring circuit is detected before said processing unit outputs said actuating pulse signal after said actuating pulse signal is released and said detected clocked output interval has not reached an established reference value.

10. The method of claim 9, wherein said step of inhibiting said actuating pulse signal is performed within a range wherein an output interval of said actuating pulse signal according to said processing unit becomes shorter than said defined time.

11. The method of claim 9, wherein said step of determining determines that said abnormality-monitoring circuit is has malfunctioned when said detected clocked time is not within a reference range from said reference value to an upper-limit value corresponding to a maximum output interval of said actuating pulse signal when said step of inhibiting h as been performed.

12. The method of claim 9, wherein said inspection-execution condition is satisfied during a predetermined time of minimum processing at said processing unit.

* * * * *